Jan. 3, 1928.
S. M. AKEYSON ET AL
1,654,772
VALVE
Filed Aug. 20, 1926
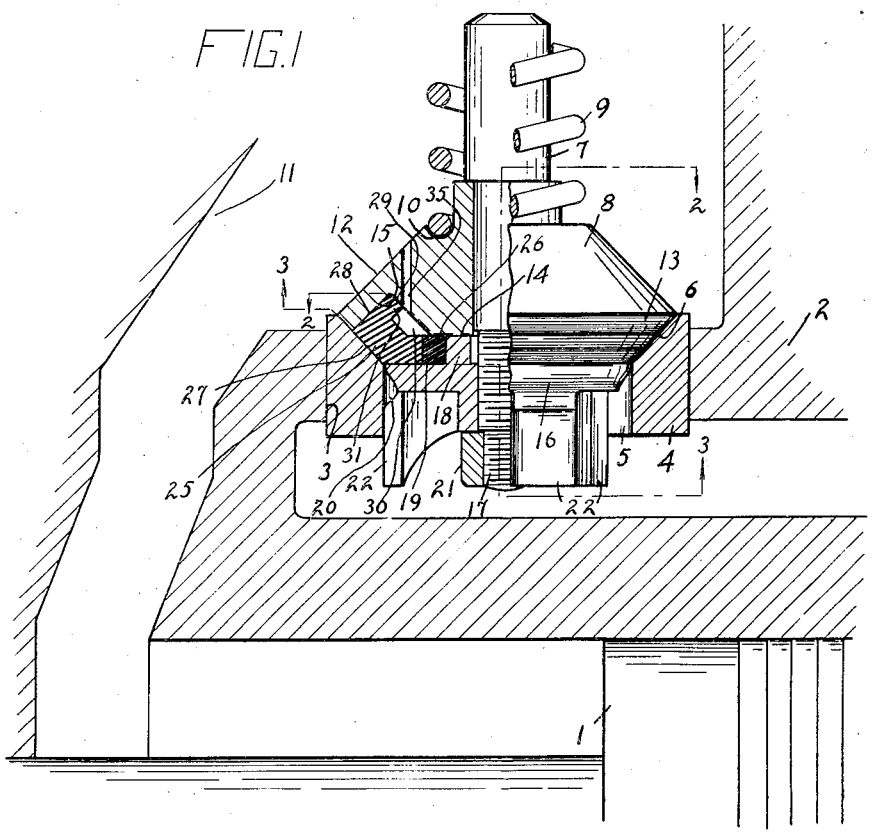
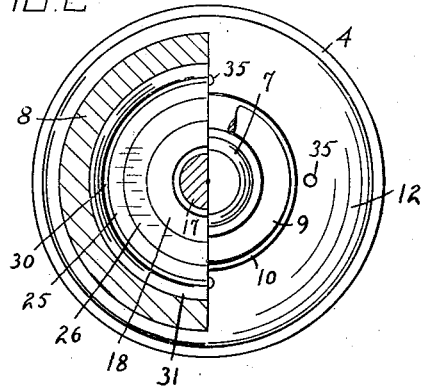
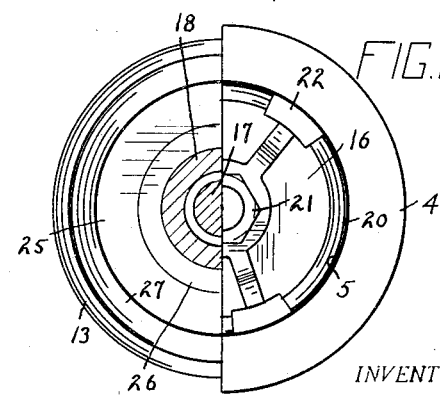
INVENTORS
SWAN M. AKEYSON
JOHN J. FERLIN
BY
R. W. Smith
ATTORNEY.

Patented Jan. 3, 1928.

1,654,772

UNITED STATES PATENT OFFICE.

SWAN M. AKEYSON, OF LONG BEACH, AND JOHN J. FERLIN, OF LOS ANGELES, CALIFORNIA, ASSIGNORS OF ONE-FOURTH TO ALBERT W. WARR, OF LOS ANGELES, CALIFORNIA, AND ONE-FOURTH TO MARTIN G. BRUMBLY, OF COMPTON, CALIFORNIA.

VALVE.

Application filed August 20, 1926. Serial No. 130,396.

This invention is a valve which may be particularly adapted for use in a reciprocating piston pump; and it is the object of the invention to employ yieldable packing for tightly closing the valve and at the same time avoid excessive wear of the packing, this result being accomplished by combining the yieldable packing with a wear resisting contact between the valve and its seat adapted to relieve the wear upon the yieldable packing.

It is a still further object of the invention to provide a cup-shaped valve seat cooperating with both the yieldable packing and wear resisting contact surfaces of the valve, so as to automatically take up wear at both of said contact surfaces and thereby insure a continued tight closing of the valve.

It is a still further object of the invention to protect the entire yieldable packing and to automatically retain all parts thereof in fixed relation to the wear resisting portion of the valve, so as to prevent flapping movement of any part of the packing such as would result in excessive wear.

It is a still further object of the invention to utilize the pressure in the valve chamber for expanding the packing to form a tight closure, and at the same time eliminate any tendency of said pressure to cause wearing movement of the yieldable packing relative to the valve as the latter is opened.

It is a still further object of the invention to so construct the valve that pressure in the valve chamber will offer minimum obstruction to its opening movement.

Further objects of the invention will be readily understood from the following description of the accompanying drawings, in which:

Fig. 1 is a fragmentary vertical section through a pump showing the improved valve.

Figs. 2 and 3 are transverse sections on the lines 2—2 and 3—3 of Fig. 1.

For the purpose of illustration the improved valve is shown in a usual pump structure which includes the reciprocating piston 1, with the pump casing 2 having openings 3 adapted to receive seats 4 for the suction valves. The seat for each valve has a bore 5 terminating in an inclined seating surface 6 so as to provide a cup-shaped seat, and the cooperating valve comprises a guide rod 7 having the valve head 8 mounted thereon with a spring 9 surrounding the guide rod and seating against the head as shown at 10.

The entire surface of head 8 which is exposed to the valve chamber 11 is inclined relative to the axis of the valve as shown at 12, and the surface 12 terminates in a seating surface 13 disposed at such an angle as to abut squarely against the outer peripheral portion of seat 6. The surface 13 engages only a relatively narrow peripheral portion of the seat 6, and terminates in the transverse inner end 14 of the head 8, said inner end 14 being annularly recessed at the inner end of surface 13 to form a relatively large inverted V-shaped groove 15.

A guide follower 16, locked in adjusted position by a nut 21 is threaded upon a pin 17 which forms a prolongation of rod 7 beyond the end surface 14, and said guide follower includes a collar 18 abutting against end surface 14 and having a shoulder 19 at its base, between which and the head 8 a yieldable packing is mounted. The guide follower beyond shoulder 19 forms a free sliding fit in bore 5, and may be a usual winged construction preferably comprising three equi-distantly spaced relatively narrow wings 22 which permit passage of fluid to an annular recess 20 in the guide follower just below shoulder 19.

The packing comprises an annulus 25 of any usual yieldable packing composition, which preferably terminates at its inner periphery in an annulus 26 of a relatively non-yielding material which is clamped between end surface 14 and shoulder 19. The yieldable packing is of increased thickness at its outer periphery and is received in groove 15 so as to extend to the inner end of abutment surface 13. The exposed surface 27 of the packing between shoulder 19 and inclined abutment surface 13 forms a prolongation of the inclination of surface 13 so that it is adapted to abut squarely against the entire inner peripheral portion of seat 6; and the outer peripheral portion of the packing which is received in groove 15, extends along the outer wall of said groove as shown at 28, and for a short distance along the inner wall of the groove as shown at 29, and is then formed with an annular recess 30 extending along the remaining portion of the inner wall of groove 15 so as to provide an annular lip 31 of the packing between recess 30 and the outer wall of groove 15.

The contact surface 27 of the packing engages the seat 6 upon initial closing of the valve to cushion subsequent engagement of wear resisting surfaces 6 and 13 which thus relieve wear of the yieldable packing; and axial bores 35 open through the valve head 8 at the annular recess 30, so that when the valve is closed, the pressure in valve chamber 11 is directed through bores 35 against the base of recess 30 so as to tend to expand the contact surface 27 of the packing against the valve seat 6 and thereby provide a tight closure for the valve.

The inclination of surface 12 throughout its length provides for minimum obstruction to opening movement of the valve by the pressure in valve chamber 11; and during said opening movement of the valve the clamping engagement of shoulder 19 against the relatively non-expandible annulus 26 which prevents bulging of the contact surface 27, and the wedging of the outer periphery 28 of the packing annulus against the outer wall of groove 15 by the pressure in recess 30 against the inner surface of lip 31 which is parallel to the peripheral surface 28 of the packing.

The yieldable packing is thus positively held against flapping as the valve is opened and closed, since it is securely held on all sides except its contact surface 27, thereby preventing undue wear such as would result from continuous movement of any part of the packing. Excessive wear at the contact surface 27 is eliminated by the abutment of wear resisting surfaces 6—13, and at the same time the valve is adapted to provide a tight closure by expansion of contact surface 27 into engagement with seat 6 by the pressure in recess 30. This tight closure is automatically maintained as a result of employing a cup-shaped valve seat and correspondingly inclining the surfaces 13—27 so as to compensate for any wear of the parts, and as a result of the tight closing of the valve irrespective of excessive wear, it is not essential that the follower guide 16 maintain exact alinement of the valve and its seat, and it is therefore practical to reduce the guide wings 21 of the follower to three in number and thereby increase the fluid passageway over that available in the usual construction where four or more guide wings are essential in order to maintain alinement of the valve.

We claim:

1. A valve comprising a head having a wear resisting abutment surface and a guide slidable in the bore of the valve seat, said guide and abutment surface being spaced by an annular groove in the valve head, yieldable packing in the groove, with a contact surface thereof forming a prolongation of the wear resisting abutment surface, the base of the packing in the groove being recessed to form a lip of the packing between the recess and a wall of the groove, and the valve head having a bore opening therethrough at said recess whereby pressure in back of the valve head is directed through said bore against the packing lip for retaining the packing in the groove.

2. A valve head having a grooved end surface, yieldable packing received in said groove, an annulus of relatively non-yieldable material forming a continuation of the yieldable packing and received against said end surface, and a guide follower adjustable relative to the valve head against the relatively non-yieldable annulus for clamping the packing relative to the valve head.

3. A valve comprising a head having a wear resisting abutment surface and a guide slidable in the bore of the valve seat, said guide and abutment surface being spaced by an annular groove in the valve head, packing in the groove forming a lip adapted to engage a wall of the groove, and the valve head having means for admitting pressure in back of the packing against the lip for forcing the latter against said wall of the groove.

4. A valve comprising a head having a wear resisting abutment surface and a guide slidable in the bore of the valve seat, said guide and abutment surface being spaced by an annular groove in the valve head, packing in the groove forming a prolongation of the wear resisting abutment surface; the base of the packing forming a lip adapted to engage a wall of the groove, and the valve head having means for admitting pressure in back of the packing against the lip for forcing the latter against said wall of the groove.

5. A valve head, relatively yieldable packing, an annulus of relatively non-yieldable material forming a continuation of the yieldable packing, and means engaging said relatively non-yieldable annulus for clamping the yieldable packing against the valve head so that it forms a seating surface for the valve head.

6. A valve head having a grooved end surface, packing including relatively yieldable and non-yieldable portions, means engaging said relatively non-yieldable portion of the packing for clamping the same against the end surface of the valve head with the relatively yieldable portion of the packing received in the groove and forming a seating surface for the valve head, the portion of the packing in the groove forming a lip adapted to engage the wall of the groove, and the valve head having means for admitting pressure in back of the packing in the groove and against the lip for holding the latter against the wall of the groove.

In testimony whereof we have affixed our signatures to this specification.

SWAN M. AKEYSON.
JOHN J. FERLIN.